(12) United States Patent
Hervieux et al.

(10) Patent No.: US 10,502,244 B2
(45) Date of Patent: Dec. 10, 2019

(54) ACTUATOR CONTROL ARRANGEMENT

(71) Applicant: Goodrich Actuation Systems SAS, Buc (FR)

(72) Inventors: Arnauld Hervieux, Versailles (FR); Johann Martin-Meyer, Masions-Laffitte (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days.

(21) Appl. No.: 15/730,793

(22) Filed: Oct. 12, 2017

(65) Prior Publication Data
US 2018/0106280 A1    Apr. 19, 2018

(30) Foreign Application Priority Data

Oct. 14, 2016   (EP) .................................... 16306363

(51) Int. Cl.
| | |
|---|---|
| *F15B 20/00* | (2006.01) |
| *B64C 13/16* | (2006.01) |
| *F15B 13/04* | (2006.01) |
| *B64C 13/42* | (2006.01) |
| *G05D 1/08* | (2006.01) |

(52) U.S. Cl.
CPC ............ *F15B 20/008* (2013.01); *B64C 13/16* (2013.01); *B64C 13/42* (2013.01); *F15B 13/0406* (2013.01); *G05D 1/0808* (2013.01)

(58) Field of Classification Search
CPC .... F15B 20/008; F15B 13/0406; B64C 13/16; B64C 13/42; Y10T 137/86654
See application file for complete search history.

(56) References Cited

U.S. PATENT DOCUMENTS

| | | | |
|---|---|---|---|
| 3,018,795 A | 1/1962 | Gordon | |
| 3,592,236 A | 7/1971 | Meulendyk | |
| 4,335,745 A | 6/1982 | Bouveret et al. | |
| 4,858,650 A | 8/1989 | Devaud et al. | |
| 4,876,906 A | 10/1989 | Jones | |
| 7,828,245 B2 * | 11/2010 | Suisse ..................... B64C 13/40 |
| | | | 137/625 |

(Continued)

FOREIGN PATENT DOCUMENTS

| | | |
|---|---|---|
| EP | 2574797 A2 | 4/2013 |
| EP | 2863069 A1 | 4/2015 |

OTHER PUBLICATIONS

Extended European Search Report for International Application No. 16306363.9 dated Mar. 1, 2017, 7 pages.

*Primary Examiner* — Eric Keasel
*Assistant Examiner* — Kevin R Barss
(74) *Attorney, Agent, or Firm* — Cantor Colburn LLP (57) ABSTRACT

An actuator control arrangement is provided comprising a pair of rotary control valves used in combination to control the operation of an actuator. The rotary control valves are driven synchronously through a hydraulic or mechanical coupling. Each rotary control valve has a by-pass mode which activates in the event of a jam. In addition each rotary control valve has a mechanism for activating the by-pass mode absent any jam. The actuator control arrangement further comprises a circuit coupling a pilot control and/or a flight control computer (FCC) to one or both of the mechanisms for remotely switching the rotary control valve(s) from an active mode to a by-pass mode under control of a pilot or FCC.

10 Claims, 5 Drawing Sheets

(56) References Cited

U.S. PATENT DOCUMENTS

| | | | |
|---|---|---|---|
| 8,897,898 B2 * | 11/2014 | Nakagawa | B64C 13/42 700/21 |
| 8,935,015 B2 * | 1/2015 | Olsoe | B64C 13/42 701/3 |
| 9,127,694 B2 | 9/2015 | Greeb et al. | |
| 2005/0132877 A1 | 6/2005 | Hart | |
| 2009/0165457 A1 | 7/2009 | Kakino et al. | |
| 2013/0075642 A1 * | 3/2013 | Hervieux | F15B 13/0406 251/304 |

* cited by examiner

ACTUATOR CONTROL ARRANGEMENT

FOREIGN PRIORITY

This application claims priority to European Patent Application No. 16306363.9 filed Oct. 14, 2016, the entire contents of which is incorporated herein by reference.

TECHNICAL FIELD

The invention relates to an actuator control arrangement, particularly to an actuator control arrangement comprising rotary valves with a by-pass mode.

BACKGROUND

Where the function of an actuator is critical to safety, it is well known to incorporate redundancy into the system in which the actuator is used so as to accommodate failures within the actuator or associated control system without preventing operation of the system.

One form of valve suitable for use in controlling the operation of such an actuator takes the form of a linear control valve. In order to permit the provision of the required degree of redundancy in the event of the linear control valve becoming jammed, a separate by-pass valve arrangement is provided to permit the valve outlets to be connected to one another and so permit the associated actuator to be moved by an external device or under the control of another valve to a desired position. An alternative valve suitable for use in this type of application is a rotary valve comprising a pair of spools arranged concentrically within a sleeve. In normal use, angular movement of one of the spools relative to the other spool is used to control the delivery of fluid to the actuator. In the event that the spools become jammed so that such relative movement is no longer possible, adjustment of the angular position of the second spool relative to the sleeve can be used to achieve the desired level of control to permit continued operation.

A rotary control valve which is arranged to occupy a by-pass mode in the event of a jam is described in EP 2863069 (A1) and an actuator control arrangement using the rotary control valve is described in EP 2574797 (A2). A rotary control valve may also be provided with a test piston which is arranged to place the rotary control valve into a by-pass mode to ensure by-pass mode is available. The test piston is accessible only during maintenance.

SUMMARY

According to a first aspect of the present disclosure there is provided an actuator control arrangement comprising a pair of rotary control valves used in combination to control the operation of an actuator, the rotary control valves being coupled so as to be driven synchronously, each rotary control valve having a by-pass mode which activates in the event of a jam; wherein each rotary control valve has a mechanism for activating the by-pass mode absent any jam; characterised in that the actuator control arrangement comprises a circuit coupling a pilot control and/or a flight control computer (FCC) to one or both of the mechanisms for remotely switching the rotary control valve(s) from an active mode to a by-pass mode under control of a pilot or FCC.

The rotary control valves may be coupled by a hydraulic coupling or a mechanical coupling (including electro-mechanical devices to couple the movements).

Each rotary control valve may comprise a first spool, a second spool encircling at least part of the first spool and angularly moveable relative thereto, and a sleeve encircling at least part of the second spool, the second spool being angularly moveable relative to the sleeve.

Each rotary control valve may establish communication between one or both control lines and a pressure line and/or a return line. Both rotary control valves may establish communication between their respective control lines, pressure lines and return lines in by-pass mode.

The first and second spools may have first and second series of ports registrable with one another, depending upon the relative angular positions of the first and second spools, to control communication between at least the pressure line, the return line and the control line provided in or connected to the sleeve.

The second spool and the sleeve may have third and fourth series of ports, axially spaced from the first and second series of ports and registrable with one another, depending upon the relative angular positions of the second spool and the sleeve, to control communication between at least the control line and the return line.

The actuator control arrangement may comprise a latch operable to resist movement of the second spool relative to the sleeve. The latch may comprise a formation provided on the second spool, the formation including a recess, a latch element cooperating with the formation and being urged into the recess to resist angular movement of the second spool.

The mechanism may comprise a hydraulic piston operable by the FCC or pilot control to put one or both of the rotary control valves into by-pass mode. The hydraulic piston may be actuated by an increase in pressure causing actuation of the piston against a biasing force.

The mechanism may comprise an electrical switch operable by the FCC or pilot control to put one or both of the rotary valves into by-pass mode.

In normal use, the second spool may be held against angular movement relative to the sleeve by the latch and angular movement of the first spool relative to the second spool controls communication between at least some of the ports of the first and second series of ports, and thus the pressure line, the return line and the control line. By appropriate control over the position of the first spool relative to the second spool, an actuator connected to the control line can be controlled. In the event of the first and second spools becoming jammed to one another, angular movement of the first spool can also result in angular movement of the second spool by virtue of these components being jammed to one another, provided the applied torque is sufficient to overcome the action of the latch. The movement of the second spool allows communication to be established between the ports of the third and fourth series of ports so as to establish communication between the control line and the return line. The establishment of such communication provides a by-pass arrangement. The incorporation of a by-pass arrangement into a rotary control valve in this manner allows the required provision of redundancy without excessively increasing the size and weight of the control valve and in a relatively simple and convenient form.

The latch may comprise a formation provided on the second spool, the formation including a recess, a latch element cooperating with the formation and being urged into the recess to resist angular movement of the second spool. Conveniently the latch element is spring biased towards the recess. The recess may be of symmetrical, ramped form.

First and second control lines may be provided, the establishment of communication between the ports of the first and second series of ports providing communication between one of the control lines and the pressure line and providing communication between the other of the control lines and the return line. The establishment of communication between the ports of the third and fourth series of ports may connect both the first control line and the second control line to the return line.

Conveniently a pair of rotary control valves of this type are used in combination in controlling the operation of the actuator. In the event of a jam within one of the valves, that valve can be moved to its by-pass more or position allowing the actuator to continue to operate under the control of the other of the control valves. It will be appreciated that although the operation of the actuator may be degraded, it can continue to function, the control valve in the by-pass mode acting as a damper which damps actuator movement but does not prevent it.

The rotary control valves are driven synchronously. This may be via a hydraulic coupling or a mechanical coupling, for example. During normal use the jammed control valve may occupy its by-pass mode at any time that the still functioning valve establishes communication between the control line(s) and the pressure line and/or return line.

In accordance with the present disclosure, the rotary control valves may now be selectively put into a by-pass mode by the pilot or the FCC using a means remote from the valves themselves. For example, a switch in the cockpit of an aircraft may be used. For example, the pilot may place either or both rotary control valves into by-pass mode when an aircraft is stationary on the ground. When in by-pass mode, the valve allows fluid communication between the pressure and return line, and allows damped communication between control chambers in an actuator. Therefore, where such an actuator is used to control a flight surface, the flight surface may be permitted damped movement when the valve is in by-pass mode. This damped movement may be useful for example when an aircraft is parked on the ground and high winds are expected that might damage a flight surface that is either held rigid, or is moveable freely and unrestrictedly. Moreover, putting a valve into by-pass mode simulates a jam in that valve, and the allows a pilot to become accustomed to flight control surface response in the case that a valve has jammed and the flight control surface responds at a reduced capacity. There may also be times where it is desirable to put one or both of the rotary control valves into by-pass mode while the aircraft is operational, for example, if certain faults develop.

According to a second aspect of the present disclosure there is provided an actuator comprising the actuator control arrangement according to any of the above aspects.

According to a third aspect of the present disclosure there is provided an aircraft comprising the actuator control arrangement according to any of the first aspects, or comprising an actuator according to the second aspect. The aircraft may be a helicopter, for example.

According to a fourth aspect of the present disclosure there is provided a method of activating a by-pass mode of a rotary control valve of an actuator control arrangement as described herein, the method comprising selecting via the FCC or pilot control to actively engage the by-pass mode of one or both of the rotary control valves.

BRIEF DESCRIPTION OF THE DRAWINGS

The actuator control arrangement will further be described in greater detail, by way of example, with reference to the accompanying drawings, in which.

DETAILED DESCRIPTION

Figure 1:
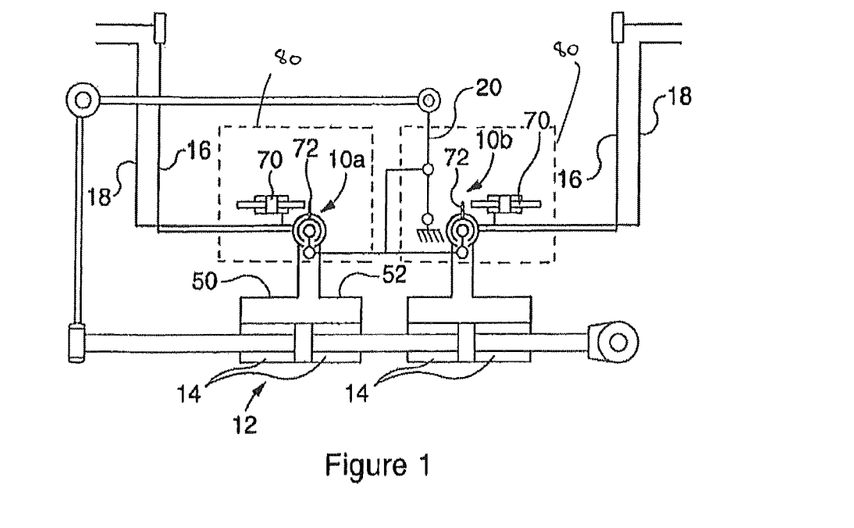
FIG. 1 is a diagram illustrating an actuator and a rotary control valve arrangement controlling the operation thereof.

Referring to the accompanying drawings, an exemplary rotary control valve 10 is illustrated for use in controlling the operation of a hydraulic actuator 12 or fuel powered actuator. As shown in FIG. 1, a pair of control valves 10a, 10b are conveniently associated with the actuator 12, each control valve 10a, 10b being operable to control the connection of respective pairs of control chambers 14 to a pressure line 16 and to a return line 18. A common drive linkage arrangement 20 is provided to control the operation of the control valves 10a, 10b such that they operate in a synchronised fashion. The rotary valves can be coupled in other ways, for example by a hydraulic coupling. As described below, in the event of a jam occurring in one of the control valves 10a, 10b, that control valve is able to occupy a by-pass position when adjustment of the actuator position is required, thereby permitting continued use of the actuator 12, albeit in a degraded manner due to the damping effect provided by the jammed control valve. The control valves 10a, 10b are provided within a housing 80, and may be accessed during e.g. maintenance.

The control valves 10a, 10b are substantially identical to one another and so only one of the control valves will be described herein in further detail.

As shown in FIGS. 2 to 9, the control valve 10 comprises a first, inner spool 22 which extends through a bore formed in a second, outer spool 24 such that the second spool 24 encircles the first spool 22. The first spool 22 includes a region of diameter substantially equal to the diameter of the adjacent part of the bore of the second spool 24 such as to form a reasonably good seal therewith. The first spool 22 is provided, at a part thereof which projects from the second spool 24, with gear teeth or spline formations 26 to allow the associated drive arrangement 20 to drive the first spool 22 for angular movement.

Figure 5:
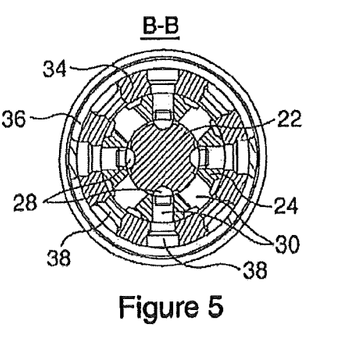

The first spool 22 is provided, on its periphery, with a first series of ports 28 in the form of recesses. The ports 28 are axially aligned with a second series of ports 30 formed in the second spool 24. Unlike the first series of ports 28, the ports 30 take the form of openings extending through the second spool 24. As best shown in FIG. 5, four equiangularly spaced ports 28 are provided on the first spool 22, and eight equiangularly spaced ports 30 are provided on the second spool 24. The design and positioning of the ports 28, 30 is such that when the first spool 22 occupies a closed position, each port 28 thereof communicates with just one of the ports 30. Angular movement of the first spool 22 in either direction away from the closed position results in each port 28 registering with a pair of adjacent ones of the ports 30, establishing communication therebetween.

The second spool 24 extends through a central passage formed in a sleeve 32. The sleeve 32 is, for convenience, of two part construction, comprising an inner sleeve 34 and an outer sleeve 36. The inner and outer sleeves 34, 36 are rigidly secured to one another and are not permitted to move relative to one another, in use.

The inner sleeve 34 defines a series of ports 38 which are axially aligned with the ports 28, 30 and, in the position illustrated, are angularly aligned with the ports 30. It will be appreciated, therefore, that when the second spool 24 occupies the angular position illustrated, angular movement of the first spool 22 controls communication between adjacent ones of the ports 38 provided in the inner sleeve 34.

Figure 9A:
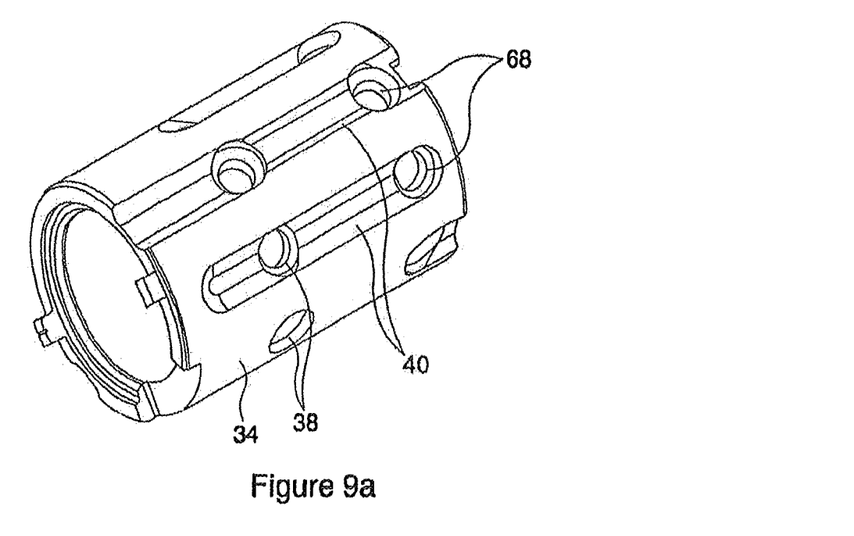
FIGS. 9a and 9b are perspective views of parts of the sleeve of the rotary control valve.
Figure 9B:
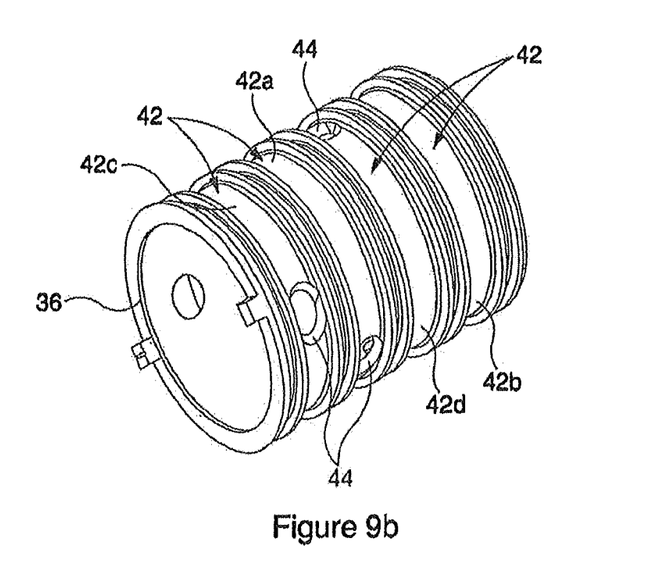

As shown in FIG. 9a, the ports 38 extend through the inner sleeve 34. The outer periphery of the inner sleeve 34 is provided with a series of axially extending channels 40 communicating with respective ones of the ports 38. The outer sleeve 36, as shown in FIG. 9b, is formed on its outer surface with a series of annular recesses or chambers 42, and each chamber 42a, 42b, 42c, 42d communicates, via respective passages 44 formed in the outer sleeve 36 (two passages 44 in each chamber 42a, 42b, 42c, 42d), with a pair of the channels 40, and hence with a pair of the ports 38. In use, the sleeve 32 is located within a housing (not shown) provided with connections such that a first one of the chambers 42a is connected to the high pressure line 16, a second one of the chambers 42b is connected to the return line 18, a third one of the chambers 42c is connected to a first control line 50 connected to one of the control chambers 14 of the actuator 12, and a fourth one of the chambers 42d is connected to a second control line 52 connected to another of the control chambers 14.

It will be appreciated that with the spools 22, 24 and sleeve 32 in the orientation shown, no high pressure or return connections to the control chambers 14 are made. The actuator 12 is thus held against movement. From this position, angular movement of the first spool 22 in one direction establishes communication between the first chamber 42a and the third chamber 42c, applying high pressure to the first control line 50 and associated control chamber 14, and establishes communication between the second chamber 42b and the fourth chamber 42d, connecting the second control line 52 and the associated control chamber 14 to the return line 18. Movement of the actuator 12 will thus take place, such movement continuing until either the actuator 12 reaches the end of its travel or the control valve is moved to another position. It will be appreciated that movement of the first spool 22 in the opposite direction reverses the connections and so drives the actuator 12 in the opposite direction.

Figure 2:
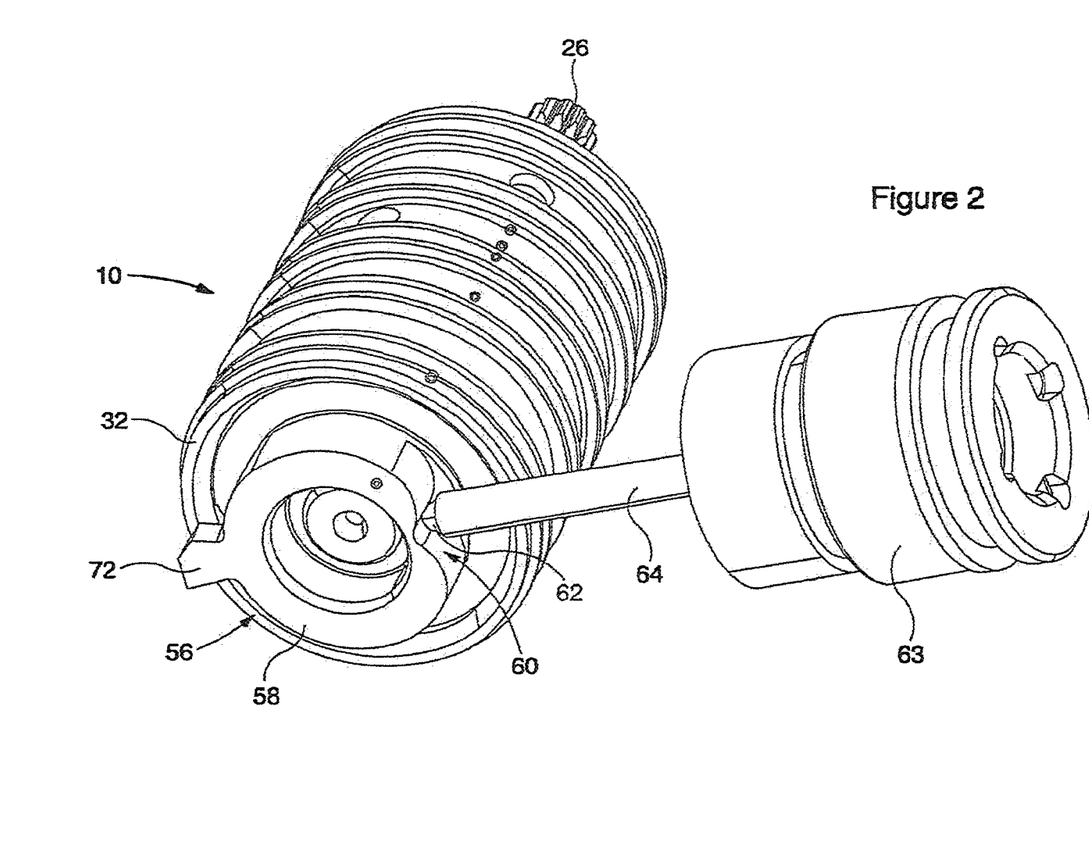
FIG. 2 is a perspective view illustrating part of an exemplary rotary control valve used in the arrangement of FIG. 1.
Figure 3:
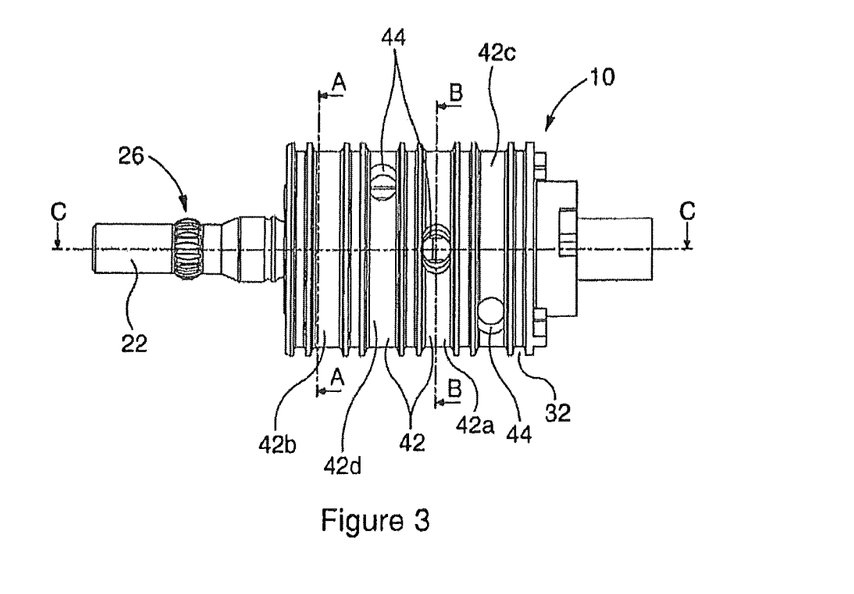
FIG. 3 is a side view of part of the rotary control valve shown in FIG. 2.

During this mode of operation it is important to ensure that the second spool 24 does not move relative to the sleeve 32 in order to ensure that the communication between the ports 30 of the second spool 24 and the ports 38 of the sleeve 32 is maintained. In order to resist angular movement of the second spool 24 a latch 56 is provided. The latch 56 comprises a flange 58 formed on the second spool 24 and provided with a recess 60. As shown in FIG. 2, a latch member 62 in the form of a ball element carried by an end of a piston rod 64 is seated in the recess 60. The piston rod 64 is biased by a spring 63 to urge the latch member 62 into the recess 60. Provided the torque applied to the second spool 24, in use, is relatively low, the spring loading applied to the latch member 62, in combination with the shape of the side walls of the recess 60, is sufficient to hold the second spool 24 against angular movement.

In use, if the first and second spools 22, 24 become jammed to one another, it will be appreciated that the continued application of torque to the first spool 22 to drive it to a desired angular position will result in a significant torque loading being applied to the second spool 24. If this applied torque is sufficiently large, angular movement of the second spool 24 may commence driving the second spool 24 towards a by-pass position, the latch member 62 riding up the ramped side walls of the recess 60 against the action of the applied spring loading to achieve such movement.

Figure 4:
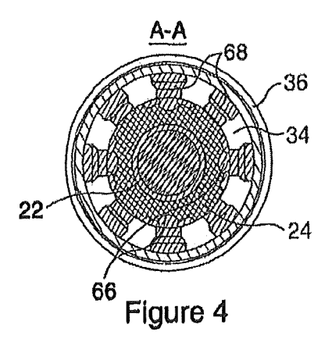
FIGS. 4, 5 and 6 are sectional views along the lines A-A, B-B and C-C, respectively, in FIG. 3.
Figure 6:
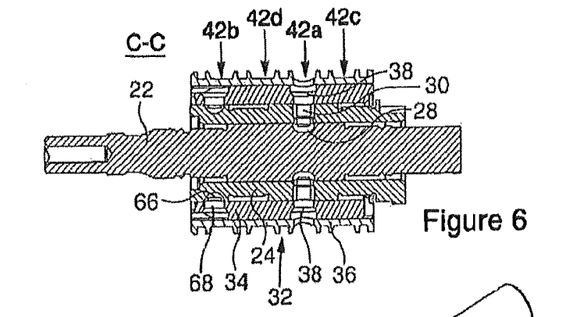
Figures 7, 8:
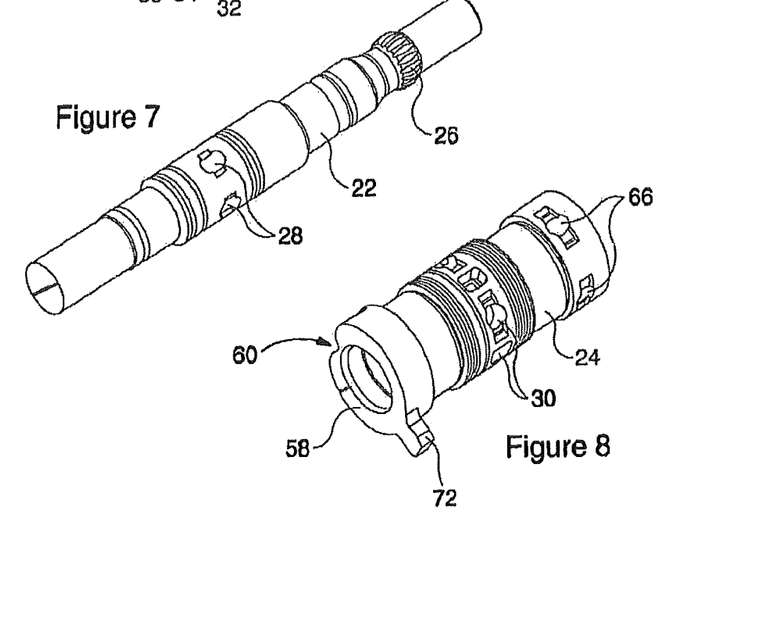
FIGS. 7 and 8 are perspective views of the first and second spools of the rotary control valve.

As shown in FIGS. 6 and 8, at an axial position spaced from the first and second series of ports 28, 30, the second spool 24 is provided with a third series of ports 66 in the form of recesses provided in the periphery thereof. As shown in FIG. 4, four such ports 66 are provided. The ports 66 are axially aligned with a fourth series of ports 68 provided in the sleeve 32. The ports 68 are equiangularly spaced, and eight such ports are provided. Alternate ones of the ports 68 communicate with the channels 40 connected to the chamber 42b, and so are connected to the return line 18. Two opposing ones of the ports 68 communicate with the channels 40 connected to the chamber 42c and so are connected to the first control line 50. The remaining two ports 68 are connected to the channels 40 communicating with the chamber 42d and so are connected to the second control line 52.

When the second spool 24 is in the angular position illustrated, in which it is latched by the latch means 56, it will be appreciated that each port 66 of the third series communicates with just one of the ports 68 of the fourth series. None of the ports 68 communicates via the ports 66 with another of the ports 68. During normal operation of the control valve 10, therefore, these ports 66, 68 and this part of the control valve 10 play no part in the operation of the control valve 10 and so have no effect upon the control or operation of the actuator 12. However, in the event that the first and second spools 22, 24 become jammed and so the second spool 24 is driven for movement, as outlined hereinbefore, after movement of the second spool 24 beyond a predetermined distance, each port 66 will move into communication with two adjacent ones of the ports 68. Consequently, communication will be established between both of the control lines 50, 52 and the return line 18. Depending upon the angular position of the first spool 22 relative to the second spool 24, one or other of the control lines 50, 52 may also be connected to the high pressure line 16, and so some parasitic losses of fuel from the high pressure line 16 to the return line 18 may take place.

It will be appreciated that by connecting both of the control lines 50, 52 to the return line 18, movement of the actuator 12 under the control of, for example, the control valve 10b in the event of a jam within the control valve 10a, may take place without the formation of a hydraulic lock that would otherwise prevent such operation. The failed control valve will damp such movement, but will not prevent it from taking place. Clearly, such damped operation may result in the actuator operating in a degraded condition. However, since the actuator can continue to function, safety is maintained.

As shown in FIG. 1, conveniently a test piston 70 is associated with each control valve 10 and is operable to engage a projection 72 formed on the second spool 24 to force the second spool 24 out of its normal operating position and thereby mimic the occurrence of a jam. By appropriate control over the pistons 70, testing of the system and its ability to drive the actuator 12 in the event of a failure can take place. For example, by operation of one of the pistons 70, one of the control valves 10 can be temporarily taken out of service to ensure that the actuator can be driven via the other control valve. After testing of one control valve in this manner, the other control valve can be taken out of service to permit completion of the testing operation. The test pistons 70 are disposed within the housing 80 so as to be able to interact with valves 10*a*, 10*b*.

Figure 10:
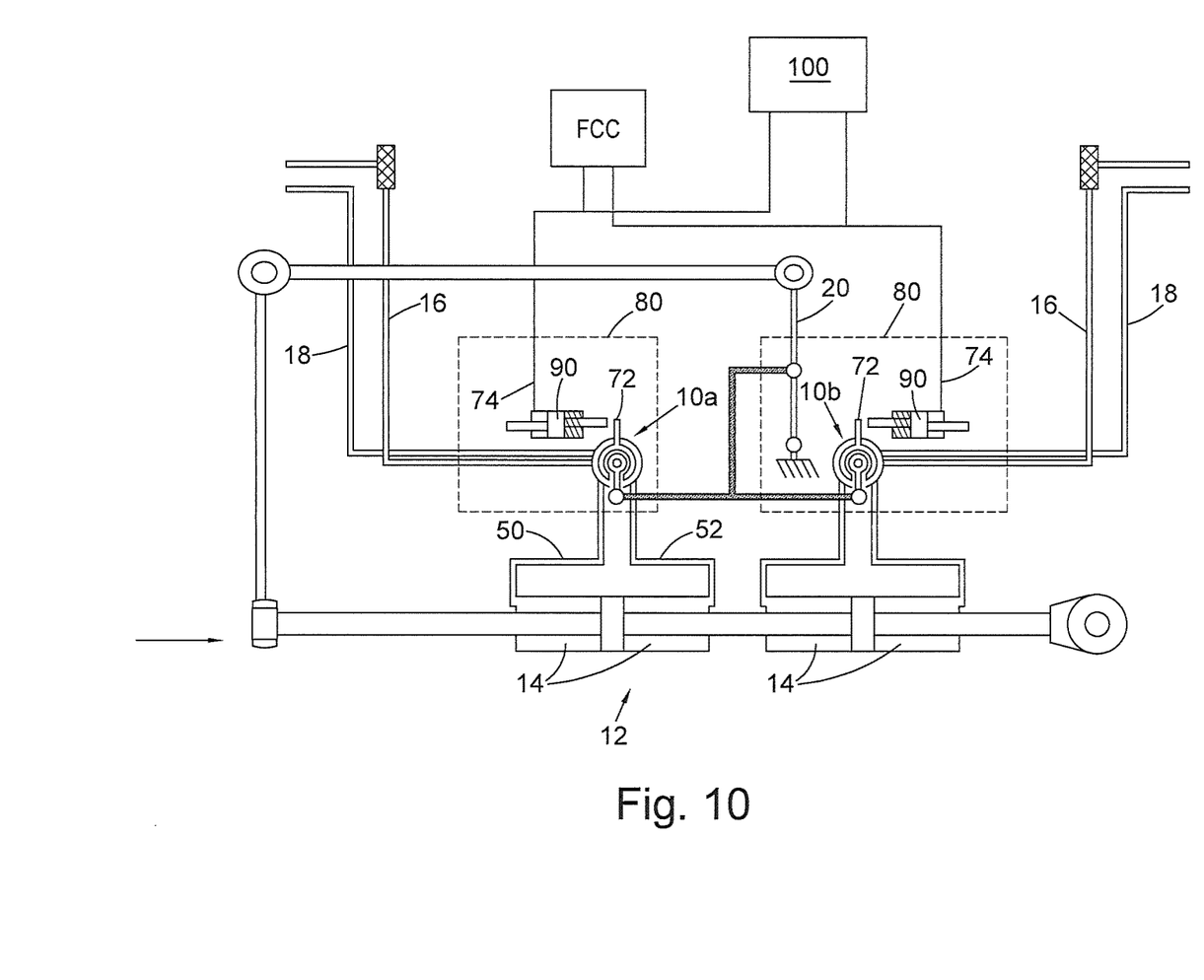
FIG. 10 is a diagram illustrating an actuator control arrangement comprising a by-pass piston connected to an FCC and a pilot control.

FIG. 10 shows an actuator control arrangement similar to that of FIG. 1. However, the arrangement of FIG. 10 include a by-pass piston 90 arranged to engage projection 72 formed on the second spool 24 in order to drive the second spool 24 to put the rotary control valve into by-pass mode. By-pass piston 90 is coupled by connection 74 to a flight control computer (FCC) and/or a pilot control 100, so that the FCC or pilot control 100 may be used to activate the by-pass piston and put the rotary control valve into by-pass mode.

The FCC and/or pilot control 100 is remote from the actuator control arrangement. For example, the pilot may be provided with a switch in the cockpit of an aircraft which may be actuated to place a rotary control valve into by-pass. Either or both of the control valves may be put into by-pass (both simultaneously), so that the actuator 12 is able to move, albeit damped. Therefore, a flight control surface controlled by the actuator would be able to move, albeit damped.

A solenoid valve may be provided as part of the FCC and/or pilot control 100 to activate one or both of the by-pass pistons 90. The solenoid valve, for example, may be used to pressurise a hydraulic line providing connection 74 to the by-pass piston(s) 90. The increase in pressure used to activate a by-pass piston 90 may be resisted by a spring provided to urge against the deployment of the piston. Alternatively connection 74 could represent an electrical connection to an electromechanical actuator which is capable of displacing projection 72.

The FCC and/or pilot control 100 may be configured to activate the rotary control valves 10*a*, 10*b* independently. Additionally or alternatively, the FCC and/or pilot control 100 may be configured to activate both rotary control valves 10*a*, 10*b* simultaneously.

While the actuator control arrangement has been described in relation to a pair of fourth stage rotary control valves as described in EP-A-2574797 and illustrated in FIGS. 2 to 9*b*, the present actuator control arrangement is not limited to this type of rotary control valve and may comprise, for example, a pair of more standard dual rotary control valves like the control valve described in U.S. Pat. No. 4,335,745, for example, with additional mode valves as necessary to select an active or by-pass mode and/or to select an active or damped mode.

As described hereinbefore, it will be appreciated that the actuator control arrangement described herein permits the valves to be put into by-pass without needing to perform maintenance on the system, or without needing to access the interior of the housing in which the valves are disposed. The valves may therefore be put into by-pass mode easily and even during flight or when park by the pilot of FCC. As such, the arrangement can be useful for, for example, parking an aircraft, or disabling flight control surfaces during training of a pilot to simulate a by-pass scenario in one or both valves. A jam in one valve may therefore be simulated during flight so that a pilot can gain experience with such a situation. The actuator control arrangement also allows the pilot of FCC to put one or both rotary control valves into by-pass modes, for example to assist with a malfunction. Moreover, the arrangement is easy to accommodate and adds minimal additional weight. A number of other benefits will be appreciated by a man skilled in the art.

The invention claimed is:

1. An actuator control arrangement comprising:
a pair of rotary control valves used in combination to control the operation of an actuator, the rotary control valves being coupled so as to be driven synchronously, each rotary control valve having a by-pass mode which activates in the event of a jam, wherein each rotary control valve has a mechanism for activating the by-pass mode absent any jam; and
a circuit coupling a pilot control and/or a flight control computer (FCC) to one or both of the mechanisms for remotely switching the rotary control valve(s) from an active mode to a by-pass mode under control of a pilot or the FCC;
wherein the mechanism comprises a hydraulic piston operable by the FCC or pilot control to put one or both of the rotary control valves into by-pass mode;
wherein each hydraulic piston is actuated by an increase in pressure causing actuation of the piston against a biasing force; and
wherein the increase in pressure used to activate a by-pass piston is resisted by a spring provided to urge against the deployment of the piston.

2. The actuator control arrangement as claimed in claim 1, wherein each rotary control valve comprises a first spool, a second spool encircling at least part of the first spool and angularly moveable relative thereto, and a sleeve encircling at least part of the second spool, the second spool being angularly moveable relative to the sleeve.

3. The actuator control arrangement as claimed in claim 2, wherein each rotary control valve(s) establishes communication between a control line(s) and a pressure line and/or a return line.

4. The actuator control arrangement as claimed in claim 3, the first and second spools having first and second series of ports registrable with one another, depending upon the relative angular positions of the first and second spools, to control communication between at least the pressure line, the return line and the control line provided in or connected to the sleeve.

5. The actuator control arrangement as claimed in claim 2, comprising a latch operable to resist movement of the second spool relative to the sleeve.

6. The actuator control arrangement as claimed in claim 5, wherein the latch comprises a formation provided on the second spool, the formation including a recess, a latch element cooperating with the formation and being urged into the recess to resist angular movement of the second spool.

7. The actuator control arrangement as claimed in claim 1, wherein the mechanism comprises an electrical switch operable by the FCC or pilot control to put one or both of the rotary valves into by-pass mode.

8. An aircraft in combination with the actuator control arrangement as claimed in claim 1.

9. A method of activating a by-pass mode of a rotary control valve of an arrangement as claimed in claim 1, the method comprising selecting via the FCC or pilot control to actively engage the by-pass mode of one or both of the rotary control valves.

10. The actuator control arrangement as claimed in claim 4, wherein the second spool and the sleeve have third and fourth series of ports, axially spaced from the first and second series of ports and registrable with one another, depending upon the relative angular positions of the second spool and the sleeve, to control communication between at least the control line and the return line.

* * * * *